(12) United States Patent
Sun et al.

(10) Patent No.: US 12,535,623 B2
(45) Date of Patent: Jan. 27, 2026

(54) OPTICAL SYSTEM AND HEAD MOUNTED DISPLAY

(71) Applicant: GOERTEK OPTICAL TECHNOLOGY CO., LTD, Shandong (CN)

(72) Inventors: Qi Sun, Shandong (CN); Bogang Zhao, Shandong (CN)

(73) Assignee: GOERTEK OPTICAL TECHNOLOGY CO., LTD, Shandong (CN)

( * ) Notice: Subject to any disclaimer, the term of this patent is extended or adjusted under 35 U.S.C. 154(b) by 347 days.

(21) Appl. No.: 18/247,004

(22) PCT Filed: Dec. 21, 2021

(86) PCT No.: PCT/CN2021/140005
§ 371 (c)(1),
(2) Date: Mar. 28, 2023

(87) PCT Pub. No.: WO2023/097812
PCT Pub. Date: Jun. 8, 2023

(65) Prior Publication Data
US 2024/0361501 A1    Oct. 31, 2024

(30) Foreign Application Priority Data

Nov. 30, 2021  (CN) .......................... 202111449752.2

(51) Int. Cl.
*G02B 3/08*     (2006.01)
*G02B 13/00*    (2006.01)
*G02B 27/01*    (2006.01)

(52) U.S. Cl.
CPC ........... *G02B 3/08* (2013.01); *G02B 13/0035* (2013.01); *G02B 27/0172* (2013.01)

(58) Field of Classification Search
CPC ........ G02B 13/0035; G02B 8/12; G02B 3/08; G02B 13/18
See application file for complete search history.

(56) References Cited

U.S. PATENT DOCUMENTS

2018/0067317 A1    3/2018  Barton et al.
2019/0331879 A1*  10/2019  Stamenov .......... G02B 27/0172
2021/0302627 A1    9/2021  Suzuki et al.

FOREIGN PATENT DOCUMENTS

CN    102902058 A    1/2013
CN    104536129 A    4/2015
CN    104635333 A    5/2015
(Continued)

*Primary Examiner* — Jessica M Merlin
(74) *Attorney, Agent, or Firm* — Ingrassia Fisher & Lorenz, LLP

(57) ABSTRACT

An optical system and a head mounted display are disclosed. The optical system comprises: a third lens, a second lens and a first lens arranged successively along a propagation direction of incident light. There are two adjacent Fresnel surfaces in the optical system, and at least one of the Fresnel surfaces has a curved base. The present disclosure provides a solution of short-focus and lightweight optical structure, in which, compared with a flat base, the use of Fresnel surface having a curved base can improve the imaging quality to a certain extent, and can reduce the total optical length and the total weight of the optical system.

12 Claims, 10 Drawing Sheets

(56) References Cited

FOREIGN PATENT DOCUMENTS

| | | | |
|---|---|---|---|
| CN | 105137590 A | 12/2015 | |
| CN | 205176383 A | 4/2016 | |
| CN | 106019567 A | 10/2016 | |
| CN | 106324838 A | 1/2017 | |
| CN | 106842558 A | 6/2017 | |
| CN | 107422481 A | 12/2017 | |
| CN | 108604007 A | 9/2018 | |
| CN | 208506366 U | 2/2019 | |
| CN | 110824712 A | 2/2020 | |
| CN | 111868603 A | 10/2020 | |
| CN | 111999896 A | 11/2020 | |
| CN | 112630973 A * | 4/2021 | ........... G02B 25/001 |
| CN | 112630974 A | 4/2021 | |
| CN | 112630977 A | 4/2021 | |
| CN | 213934402 U | 8/2021 | |
| JP | H07244246 A | 9/1995 | |
| JP | 2000002933 A | 1/2000 | |
| JP | 2017211475 A | 11/2017 | |
| JP | 2018101131 A | 6/2018 | |
| JP | 2020020935 A | 2/2020 | |
| WO | 2012114970 A1 | 8/2012 | |
| WO | 2017181359 A1 | 10/2017 | |
| WO | 2020012817 A1 | 1/2020 | |

* cited by examiner

OPTICAL SYSTEM AND HEAD MOUNTED DISPLAY

CROSS-REFERENCE TO RELATED APPLICATIONS

This Application is a U.S. National-Stage entry under 35 U.S.C. § 371 based on International Application No. PCT/CN2021/140005, filed Dec. 21, 2021 which was published under PCT Article 21(2) and which claims priority to Chinese Application No. 202111449752.2, filed Nov. 30, 2021, which are all hereby incorporated herein in their entirety by reference.

TECHNICAL FIELD

This application pertains to the technical field of optical imaging, more specifically, it relates to an optical system and a head mounted display.

BACKGROUND

In recent years, augmented reality (AR) technology and virtual reality (VR) technology have been applied in intelligent wearable devices and developed rapidly. The core component of both the augmented reality technology and the virtual reality technology is the display optical system. The display effect of the display optical system will directly determine the quality of intelligent wearable devices. At present, intelligent wearable devices also need to meet the requirements of miniaturization and lightweight, and there are also similar requirements for the display optical system.

In the prior art, take VR devices as an example, most conventional VR devices use a display optical system obtained by combining a one-piece lens with a display screen. However, due to the optical path imaging requirements, the lens will be far away from the display screen, which leads to the large size of the VR device and is not conducive to the miniaturization of the product, and conventional VR devices are usually heavy. These may lead to poor use experience when the user wears the VR device. In addition, there are also conventional VR devices adapting a solution of folded optical path. Although this solution can realize the miniaturization and lightweight of VR devices, it has the problems of high production cost, low light efficiency (<25%) and ghosting.

Therefore, there is an urgent need to make new improvements on conventional display optical systems. In addition, other objects, desirable features and characteristics will become apparent from the subsequent summary and detailed description, and the appended claims, taken in conjunction with the accompanying drawings and this background.

SUMMARY

The object of the present disclosure is to provide a new technical solution of an optical system and a head mounted display.

According to an aspect of the present disclosure, an optical system is provided. The optical system comprises:
a third lens, a second lens and a first lens arranged successively along a propagation direction of incident light;
wherein there are two adjacent Fresnel surfaces in the optical system, and at least one of the Fresnel surfaces has a curved base.

Optionally, the first lens and the second lens both have positive focal powers, and the third lens has a negative focal power.

Optionally, two adjacent surfaces of the first lens and the second lens are Fresnel surfaces, and at least one of the Fresnel surfaces has a curved base.

Optionally, the first lens comprises a first surface and a second surface, and the second lens comprises a third surface and a fourth surface;
the second surface and the third surface are arranged adjacent to each other and are both set as Fresnel surfaces, and at least one of the Fresnel surfaces has a curved base; and
the first surface and the fourth surface are both aspherical surfaces.

Optionally, a first spacing T1 is provided between the first lens and the second lens, the first spacing T1 is set to 0.2 mm≤T1≤1 mm;
a second spacing T2 is provided between the second lens and the third lens, and the second spacing T2 is set to 1 mm≤T2≤3 mm; and
the first lens, the second lens and the third lens are located on a same optical axis.

Optionally, the third lens comprises a fifth surface and a sixth surface; and at least one of the fifth surface and the sixth surface is an aspherical surface.

Optionally, the first lens and the second lens are made of a same material, and are both made of a COP material; and
the third lens is made of an OKP material or an EP material.

Optionally, an effective focal length f1 of the first lens is 20 mm≤f1≤40 mm;
an effective focal length f2 of the second lens is 20 mm≤f2≤40 mm; and
an effective focal length f3 of the third lens is −75 mm≤f3≤−35 mm.

Optionally, an effective focal length f of the optical system is 15 mm≤f≤25 mm.

According to another aspect of the present disclosure, a head mounted display is provided. The head mounted display comprises an optical system as described above.

The beneficial effects of the present disclosure are as follows.

The embodiments of the present disclosure propose a solution of short-focus and lightweight optical structure, in which a lens group is formed by multiple (such as three) lenses, two adjacent Fresnel surfaces are designed in the optical path structure, and at least one of the Fresnel surfaces is designed as a curved base. Since the use of the Fresnel surface having a curved base can make the lens thinner, the design can reduce the total weight of the optical system; it can also reduce the total optical length of the entire optical system and thus improve the imaging quality. The optical system obtained can be applied in, for example, head mounted displays (such as VR devices), and facilitates the miniaturization and lightweight of head mounted displays.

By the following detailed description of the exemplary embodiments of the present disclosure with reference to the accompanying drawings, other features and advantages of the present disclosure will become clear.

BRIEF DESCRIPTION OF DRAWINGS

The present invention will hereinafter be described in conjunction with the following drawing figures, wherein like numerals denote like elements, and.

Figure 1:
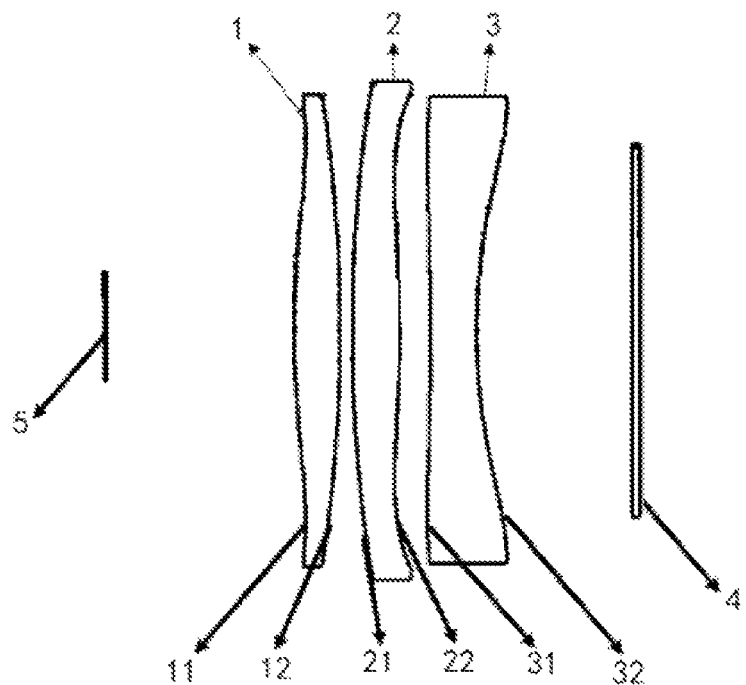
FIG. 1 is a schematic diagram of the structure of an optical system according to an embodiment of the present disclosure.

In the drawings: 1. first lens; 2. second lens; 3. third lens; 4. display screen; 5. human eye; 11. first surface; 12. second surface; 21. third surface; 22. fourth surface; 31. fifth surface; 32. sixth surface.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

The following description of at least one exemplary embodiment is in fact only illustrative, and in no way serves as any restriction on the present disclosure and its application or use.

The techniques, methods and equipment known to a person of ordinary skill in the art may not be discussed in detail, but in appropriate cases, these techniques, methods and equipment shall be considered as a part of the specification.

In all the examples shown and discussed herein, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in the subsequent drawings.

The optical systems and the head mounted displays according to embodiments of the present disclosure will be described in detail below with reference to FIGS. 1 to 11.

According to an aspect of the present disclosure, an optical system is provided. The optical system is a direct transmission optical system having short-focus, lightweight and high-resolution, which is suitable for application in electronic devices, for example, head mounted displays (HMD) such as VR devices (such as VR glasses or VR helmets). It has a good application prospect.

Figure 2:
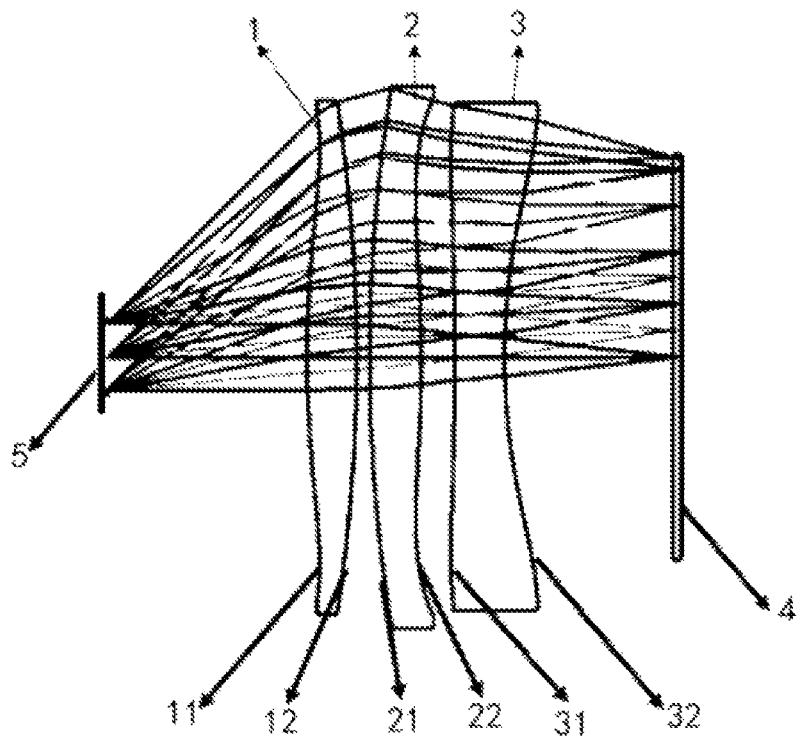
FIG. 2 is a schematic diagram of the imaging principle of an optical system according to an embodiment of the present disclosure.

The optical system according to an embodiment of the present disclosure, as shown in FIGS. 1 and 2, comprises a third lens 3, a second lens 2 and a first lens 1 arranged successively along the propagation direction of the incident light. There are two Fresnel surfaces arranged adjacent to each other, and at least one of the Fresnel surfaces has a curved base.

The optical system according to the embodiment of the present disclosure is designed as a direct transmission optical path structure. The design of optical path structure is relatively simple and thus is easy to make.

It should be noted that the optical system may also comprise a display screen 4.

In the optical path structure, the display screen 4 can be used to emit light, i.e., to provide an incident light for the optical system.

That is to say, in the optical system according to the embodiment of the present disclosure, a lens combination is designed and used, which comprises, for example, three optical lenses, as shown in FIGS. 1 and 2. The lens combination is arranged at a light exit side of the display screen 4 (specifically, in the propagation direction of the incident light emitted from the display screen 4), and can be used to project the incident light into the human eye 5 for imaging, thereby realizing the imaging function of the optical system.

In the optical system of the embodiment of the present disclosure, the spot size is small (about 50 μm), and the imaging quality of the entire optical system is good.

In the optical system according to the embodiment of the present disclosure, there are two adjacent Fresnel surfaces, and at least one of the Fresnel surfaces has a curved base. Compared with the solution in which only the traditional Fresnel surface having a flat base is used, the use of the Fresnel surface having a curved base increases the design freedom of optical path structure, and provides a basis for further improving the imaging quality. It is helpful to form an optical structure with high resolution and short-focus.

In the optical system according to the embodiment of the present disclosure, at least one of the Fresnel surfaces adopts a curved base, which, compared with the traditional Fresnel surface having a flat base, can improve the imaging quality by about 25% (from 35 μm to 48 μm), reduce the total optical length by about 1 mm, and reduce the overall weight of the entire optical system by about 8.2%. This makes the optical system have the features of lightweight and miniaturization as well as good imaging quality.

The embodiment of the present disclosure proposes a solution of short-focus and lightweight optical structure, in which a lens group is formed by multiple lenses (such as three optical lenses), two adjacent Fresnel surfaces are designed in the optical path structure, and at least one of the Fresnel surfaces has a curved base. Since the use of the Fresnel surface having a curved base can make the lens thinner, the design can reduce the total weight of the optical system; it can also reduce the total optical length of the entire optical system and improve the imaging quality. The optical system obtained in this way can be applied in, for example, head mounted displays (such as VR devices), and facilitates the miniaturization and lightweight of head mounted displays.

In sum, the solution according to the embodiment of the present disclosure overcomes the problems caused by the conventional combination solution of one-piece lens plus display screen, i.e., the lens is far away from the display screen, which leads to the larger size of the VR device and is not conducive to the miniaturization of the product; moreover, the light efficiency is low. At the same time, it can also overcome the defects caused by using a folded optical path, and has relatively low processing difficulty and production cost; the direct transmission optical structure is also simpler than the folded optical path.

As shown in FIGS. 1 and 2, the optical system of the embodiment of the present disclosure also comprises a display screen 4, for example, which is high PPI (for example, 1.4 inch, pixel size 24 μm). On this basis, the conventional one-piece lens (1P) structure or two-piece lens (2P) structure is not enough to distinguish this type of display screen. The reason is as follows.

The one-piece lens (1P) structure only has two surfaces for optimization of surface freedom, its convergence ability is limited, and the aberration or chromatic aberration cannot be corrected. The pixel size (i.e., spot size) that can be distinguished in the full field of view is about 80 μm to 100 μm. More importantly, it cannot realize short-focus.

The two-piece lens (2P) structure increases the surface freedom of lens surface for optimization and can realize short-focus, but it still has the limitation of resolution. Its pixel size (i.e., spot size) that can be distinguished in the full field of view is about 60 μm to 80 μm.

However, in the solution according to the embodiment of the present disclosure, the optical lens combination structure is adopted, and it can further improve the resolution of the pixel and correct the chromatic aberration to a certain extent. What is formed is a direct transmission short-focus optical path structure. The imaging spot size of the entire optical system is small (about 50 μm), the imaging effect is good.

In some examples of the present disclosure, as shown in FIGS. 1 and 2, the first lens 1 and the second lens 2 both have positive focal powers, and the third lens 3 has a negative focal power.

That is to say, in the entire optical system, the first lens 1 and the second lens 2 are positive lenses, for example; the third lens 3 is a negative lens, for example. In this way, two positive lenses cooperate with one negative lens to form a direct transmission short-focus high-resolution optical path structure.

It can be understood that the first lens 1 and the second lens 2, cooperating with their Fresnel surfaces, can provide a large focal power. At the same time, considering the influence of chromatic aberration, the negative lens (i.e., the third lens 3) is adopted, which can be used to eliminate chromatic aberration. With the participation of the negative lens, the low dispersion effect of the optical path structure can be achieved.

In some examples of the present disclosure, as shown in FIGS. 1 and 2, two adjacent surfaces of the first lens 1 and the second lens 2 are Fresnel surfaces, and at least one of the Fresnel surfaces has a curved base.

It can be understood that in the entire optical path structure, at least one of the two adjacent Fresnel surfaces has a curved base.

More preferably, two adjacent Fresnel surfaces are both designed as cueved bases. In this way, the first lens 1 and the second lens 2 will be even thinner, thereby further reducing the weight and total optical length value of the optical system and improving the imaging quality as well.

Of course, it may also be that one Fresnel surface is a curved base, the other Fresnel surface is a flat base, and they are arranged adjacent to each other. Those skilled in the art can make flexible choices according to specific circumstances, and the present disclosure has no particular limitation herein.

In a specific embodiment of the present disclosure, as shown in FIG. 1, the first lens 1 comprises a first surface 11 and a second surface 12, and the second lens 2 comprises a third surface 21 and a fourth surface 22.

The second surface 12 and the third surface 21 are arranged adjacent to each other and are both set as Fresnel surfaces, and at least one of the Fresnel surfaces has a curved base.

The first surface 11 and the fourth surface 22 are both aspherical surfaces.

Further, the first surface 11 and the fourth surface 22 are both convex surfaces.

Optionally, as shown in FIG. 1, in the optical system according to the embodiment of the present disclosure, the first surface 11 of the first lens 1 directly faces the human eye 5, and the first surface 11 is plated with an anti-reflection film and a hardened film; the second surface 12 of the first lens 1 is arranged adjacent to the third surface 21 of the second lens 2, and the second surface 12 is plated with an anti-reflection film.

For the first lens 1, the surface shapes of the first surface 11 and the second surface 12 are different. The first surface 11 is set as an aspherical surface (a convex surface), and the second surface 12 is set as a Fresnel surface having a curved base. In this way, the first lens 1 has a combined surface shape of two surface shapes: aspherical surface+Fresnel surface having a curved base, which can realize short-focus and high resolution.

Of course, the second surface 12 may also be a Fresnel surface having a flat base.

It should be noted that in the embodiment of the present disclosure, it is further designed that at least one layer of anti-reflection film is plated on the first surface 11 and the second surface 12 of the first lens 1 respectively. This is because, after the two surfaces of the first lens 1 are respectively plated with an anti-reflection film, the anti-reflection film can be used to reduce reflected light, thereby increasing the transmissivity of light on each surface of the positive lens.

For example, the first surface 11 of the first lens 1 may be plated with a hardened film in addition to the anti-reflection film. The reason is that the first surface 11 of the first lens 1 faces outward and needs to avoid scratches, collisions and other damages. The service life of the first lens 1 can be improved by plating the hardened film. The hardness, strength, etc. of the first surface 11 can be improved by plating the hardened film on the first surface 11 (i.e., hardening the first surface 11). This is beneficial to improve the service life of the entire optical system.

Of course, in the embodiments of the present disclosure, it is not limited to the first surface 11 of the first lens 1 that is plated with a hardened film, the second surface 12 of the first lens 1 may also be plated with a hardened film. Those skilled in the art can flexibly adjust according to specific needs, and the present disclosure has no particular limitation herein.

In addition, in the embodiment of the present disclosure, the first lens 1 may further have the following parameters.

For example, the absolute value of the radius R1 of the first surface 11 of the first lens 1 satisfies 45 mm≤ Abs (R1)≤65 mm;

the absolute value of the radius R0 of the curved base on the second surface 12 of the first lens 1 satisfies 40 mm≤ Abs (R0)≤200 mm, and the absolute value of the radius R2 of the second surface 12 satisfies 20 mm≤ Abs (R2)≤40 mm;

the absolute value of the conic constant K1 of the first surface 11 and the second surface 12 of the first lens 1 satisfies Abs (K1)≤10.

In the embodiment of the present disclosure, after optimizing the surface shape of the first lens 1, if the processing difficulty and cost are considered, more preferably, the conic constant (i.e., the above K1) of the first lens 1 is, for example, within [−10, 10], and the radius R of the Fresnel surface (i.e., the second surface 12) of the curved base of the first lens 1 is greater than 23 mm.

In some examples of the present disclosure, the second lens 2 and the first lens 1 may have the same combination form of surface shapes. As shown in FIGS. 1 and 2, the third surface 21 of the second lens 2 is a Fresnel surface (for example, a Fresnel surface having a curved base), and the fourth surface 22 of the second lens 2 is set as an aspherical surface (for example, a convex surface).

It should be noted that when the Fresnel surface of the first lens 1 (i.e. the second surface 12) has a curved base, the Fresnel surface of the second lens 2 (i.e. the third surface 21) can have either a curved base or a flat base.

Optionally, the third surface 21 and the fourth surface 22 are also plated with an anti-reflection film. The reflection light is reduced through the anti-reflection film, thereby increasing the transmissivity of light on the two surfaces of the second lens 2.

In addition, in the embodiment of the present disclosure, the second lens 2 may further have the following parameters.

In some examples of the present disclosure, the absolute value of the radius R0' of the curved base on the third surface 21 satisfies 60 mm≤ Abs (R0')≤170 mm, and the absolute value of the radius R3 of the third surface 21 satisfies 20 mm≤ Abs (R3)≤40 mm;

the absolute value of the radius R4 of the fourth surface 22 satisfies 60 mm≤ Abs (R4)≤80 mm;

the absolute value of the conic constant K2 of the third surface 21 and the fourth surface 22 of the second lens 2 satisfies Abs (K2)≤10.

The surface combination of the second lens 2 is the same as that of the first lens 1.

After optimizing the surface shape of the second lens 2, if the processing difficulty and cost are considered, more preferably, the conic constant (i.e., the above K2) of the second lens 2 is, for example, within [−10, 10], and the radius R of the Fresnel surface (i.e., the third surface 21) of the curved base of the second lens 2 is greater than 23 mm.

It should be noted that the first lens 1 and the second lens 2 both have Fresnel surfaces. Considering the processing of lens surface shape, it is necessary to set the surface parameter within a certain range, otherwise the processing accuracy will be low or the cutter may break (this is because the tooth shape processing is difficult, and if the acute angle of the tooth shape is smaller, the processing angle and action will be more difficult). Because of this, it is preferable to set the conic constant K value within the range of [−10, 10], and the R value of the Fresnel surface is greater than 23 mm.

For example, the first lens 1 and the second lens 2 both adopt a combination of aspherical surface+Fresnel surface having a curved base, and by selecting and cooperating with materials having different refractive indexes and Abbe numbers, low dispersion and short-focus of the optical path structure can be achieved.

In some examples of the present disclosure, as shown in FIGS. 1 and 2, the third lens 3 comprises a fifth surface 31 and a sixth surface 32, and at least one of the fifth surface 31 and the sixth surface 32 is an aspherical surface.

In the solution of the present disclosure, the third lens 3 is a negative lens (having a negative power), which is thin at the center and thick at the edge and has the ability to diverge light. In the entire optical path structure, the third lens 3 can be used to eliminate chromatic aberration.

For example, the third lens 3 may be a biconcave lens (i.e., both surfaces are concave) or a plano-concave lens (i.e., one surface is concave and the other surface is flat).

More preferably, the fifth surface 31 is a flat surface, and the sixth surface 32 is a concave surface. Namely, in the optical path structure, the face adjacent to the fourth surface 22 is a flat surface, and the face adjacent to the display screen 4 is a concave surface.

Optionally, the fifth surface 31 and the sixth surface 32 are both plated with an anti-reflection film.

After the two surfaces of the third lens 3 are respectively plated with an anti-reflection film, the reflection light can be reduced by the anti-reflection film to increase the transmissivity of light on the two surfaces of the third lens 3.

The lens group and the surface combination in the lenses in the present disclosure well realize high resolution and low dispersion.

In addition, in the embodiment of the present disclosure, the third lens 3 may further have the following parameters.

The absolute value of the radius R5 of the fifth surface 31 of the third lens 3 satisfies Abs (R5)≥200 mm; the absolute value of the radius R6 of the sixth surface 32 of the third lens 3 satisfies 30 mm≤ Abs (R6)≤60 mm; the absolute value of the conic constant K3 of the fifth surface 31 and the sixth surface 32 of the third lens 4 satisfies Abs (K3)≤10.

In a specific example of the present disclosure, as shown in FIG. 1, the optical system comprises: the display screen 4, and the first lens 1, the second lens 2 and the third lens 3. The display screen 4 acts as a display light source. The first lens 1 and the second lens 2 are optical elements formed by aspherical surface+Fresnel surface having a curved base, and the third lens 3 on the side close to the display screen 4 is set as a negative lens. Each surface of each lens is plated with an anti-reflection film, and the first surface 11 of the first lens 1 is plated with a hardened film and an anti-reflection film.

On this basis, as shown in FIG. 2, the light emitted from the display screen 4 passes through the sixth surface 32 of the third lens 3 plated with an anti-reflection film, and enters the interior of the third lens 3. The light passing through the third lens 3 is diverged and enters the second lens 2. Two surfaces of the second lens 2 are also both plated with an anti-reflection film. In this way, the light is converged after passing through the second lens 2, and then enters the first lens 1. The first lens 1 is also a converging positive lens. After passing through the first lens 1, the light enters the human eye 5 for imaging. There is no optical path folding in the entire optical system, and the surface of each lens is plated with an anti-reflection film, so the light transmission efficiency is high.

In the embodiment of the present disclosure, a first spacing T1 is provided between the first lens 1 and the second lens 2; a second spacing T2 is provided between the third lens 3 and the second lens 2, and the second spacing T2 is greater than the first spacing T1.

In some examples of the present disclosure, a first spacing T1 is provided between the first lens 1 and the second lens 2, the first spacing T1 is set to 0.2 mm≤ T1≤1 mm; a second spacing T2 is provided between the second lens 2 and the third lens 3, and the second spacing T2 is set to 1 mm≤T2≤3 mm; the first lens, the second lens and the third lens are located on the same optical axis.

In the embodiment of the present disclosure, a narrow air gap is provided between the first lens 1 and the second lens 2; at the same time, a narrow air gap is also provided between the second lens 2 and the third lens 3. In the solution of the present disclosure, by optimizing the air gaps between the lenses, it facilitates realizing the miniaturization of the entire optical system.

In addition, if the optical system is also provided with a display screen 4, after the spacings between lenses are reasonably arranged, the value of the spacing between the third lens 3 and the display screen 4 should also be considered.

For example, a third spacing T3 is provided between the third lens 3 and the display screen 4.

Optionally, the third spacing T3 is set to 5 mm≤T3≤15 mm.

In some examples of the present disclosure, the first lens 1 and the second lens 2 are made of the same material, and both are made of a COP material; the third lens 3 is made of an OKP material or an EP material.

COP materials, OKP materials and EP materials are all light transmitting resin materials with light weight. By using these materials to make lenses, the weight of lens groups can be reduced and thus lightweight can be realized.

For material selection of each lens, based on the consideration of short-focus and chromatic aberration, the combinations of materials having high refractive indexes and high/low Abbe numbers are selected for design optimization.

Those skilled in the art can reasonably select the materials of the first lens 1, the second lens 2 and the third lens 3 according to actual needs, which are not limited to the above types of materials.

In some examples of the present disclosure, the thickness h1 at the center of the first lens 1 is 2 mm≤ h1≤4 mm; the thickness h2 at the center of the second lens 2 is 3 mm≤ h2≤ 5 mm; the thickness h3 at the center of the third lens 3 is 2 mm≤h3≤4 mm.

The thickness of each lens will not be too thick, which is also conducive to reducing the weight of the entire optical path structure.

In some examples of the present disclosure, the effective focal length f1 of the first lens 1 is 20 mm≤f1≤40 mm; the effective focal length f2 of the second lens 2 is 20 mm≤ f2≤ 40 mm; the effective focal length f3 of the third lens 3 is -75 mm≤ f3≤-35 mm.

It should be noted that, in the present disclosure, the effective focal length f1 of the first lens 1 and the effective focal length f2 of the second lens 2 are both greater than the effective focal length f of the optical system. The sum of the effective focal length f1 of the first lens 1 and the effective focal length f2 of the second lens 2 is greater than the absolute value of the effective focal length f3 of the optical system.

In some examples of the present disclosure, the effective focal length f of the optical system satisfies 15 mm≤f≤25 mm.

The present disclosure provides a short-focus optical system. There is no optical path folding in the entire optical system. It is a direct transmission optical system that can achieve high-resolution imaging.

The following is an application example of the solution according to an embodiment of the present disclosure:

(1) A 90 degree field of view is realized in 1.4 inch display screen 4.
(2) The distortion is less than 34.5%, and the field curvature is less than 0.6 mm.
(3) The chromatic aberration is less than 158 μm. The virtual image distance is 1500 mm.
(4) The spot size in the overall field of view is less than 35 μm, realizing clear imaging in visible light band (450 nm to 630 nm).
(5) The effective focal length of the entire optical system is 18.4 mm.

First Embodiment

The first embodiment provides an optical system, and the structure parameters in the optical system are shown in Table 1.

Table 1 lists the optical surface numbers (Surface) that are numbered sequentially from the human eye 5 (diaphragm) to the display screen 4, the curvature (C) of each optical surface on the optical axis, the distance (T) between each optical surface and the next optical surface on the optical axis from the human eye 5 (diaphragm) to the display screen 4, and even aspheric coefficients α2, α3, α4.

The aspheric coefficients can satisfy the following equation:

$$z = \frac{CY^2}{1 + \sqrt{1 - (1+k)C^2 Y^2}} + \sum_{i=2}^{N} \alpha_i Y^{2i} \quad (1)$$

In equation (1), z is a coordinate along the optical axis, Y is a radial coordinate having the unit of lens length as unit, C is the curvature (1/R), and K is the conic constant, $\alpha_i$ is the coefficient of each higher-order term, and 2i is the order of aspheric coefficient. In the solution of the present disclosure, considering the smoothness of the field curve, there is no high order spheric coefficients designed to be 4th order.

TABLE 1

| Surf | Type | Radius | Thickness | GLASS | Clear Diam | Conic | Maxterm |
|---|---|---|---|---|---|---|---|
| OBJ | STANDARD | Infinity | -1500 | | 3000 | 0 | |
| STO | STANDARD | Infinity | 12 | | 4 | 0 | |
| 2 | EVENASPH | 61.14898 | 2.999563 | K26R | 29.39599 | -8.1135 | |
| 3 | XFRESNEL | -99.999 | 0.7751025 | | 30.85914 | 0 | 3 |
| 4 | XFRESNEL | 100.21 | 3.116223 | K26R | 32.55903 | 0 | 3 |
| 5 | EVENASPH | -72.4007 | 1.995415 | | 31.08246 | -10.000 | |

TABLE 1-continued

| 6 | EVENASPH | −208.88 | 2.998836 | OKP-1 | 30.51838 | −9.99994 |
| 7 | EVENASPH | 39.99997 | 10.15807 | | 28.69334 | 1.553201 |
| 8 | STANDARD | Infinity | 0.45 | BK7 | 24.34747 | 0 |
| 9 | STANDARD | Infinity | 0.1000907 | | 24.27864 | 0 |
| IMA | STANDARD | Infinity | | | 24.08766 | 0 |

| Surf | Curvature | Conic | Coeff-4th | Coeff-6th |
|---|---|---|---|---|
| OBJ | | | | |
| STO | | | | |
| 2 | | | | |
| 3 | −4.22E−02 | −6.21E−01 | 7.00E−06 | −1.64E−07 |
| 4 | 3.57E−02 | −5.78E−01 | 2.39E−05 | 2.85E−08 |
| 5 | | | | |
| 6 | | | | |
| 7 | | | | |
| 8 | | | | |
| 9 | | | | |
| IMA | | | | |

The performance of the optical system according to the first embodiment of the present disclosure is demonstrated by the following parameters.

Figure 3:
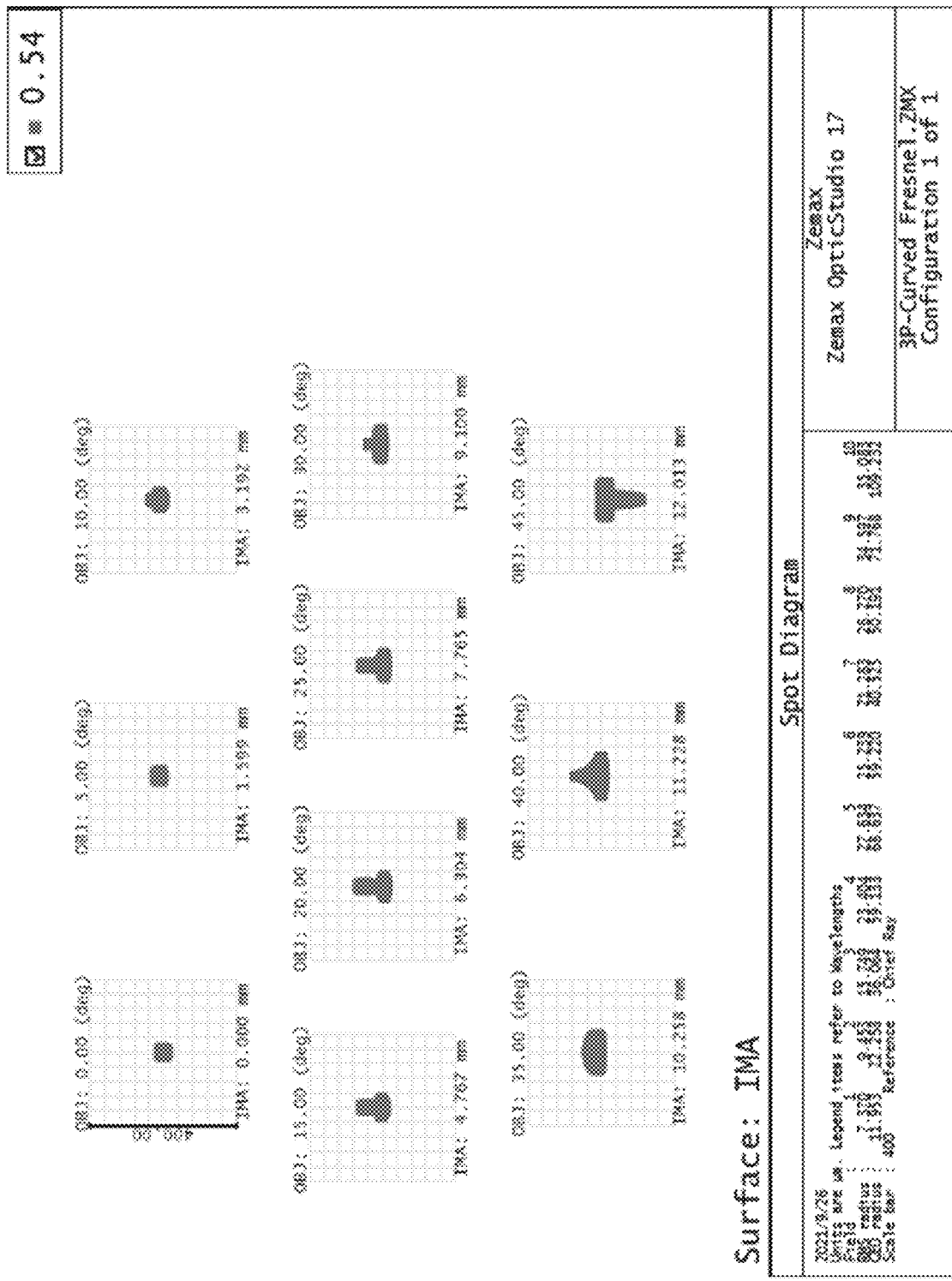
FIG. 3 is a spot diagram of an optical system according to a first embodiment of the present disclosure.

As shown in FIG. 3, the maximum spot size is at the position of the maximum field of view (1.0F), and its maximum value is less than 35 μm.

Figure 4:
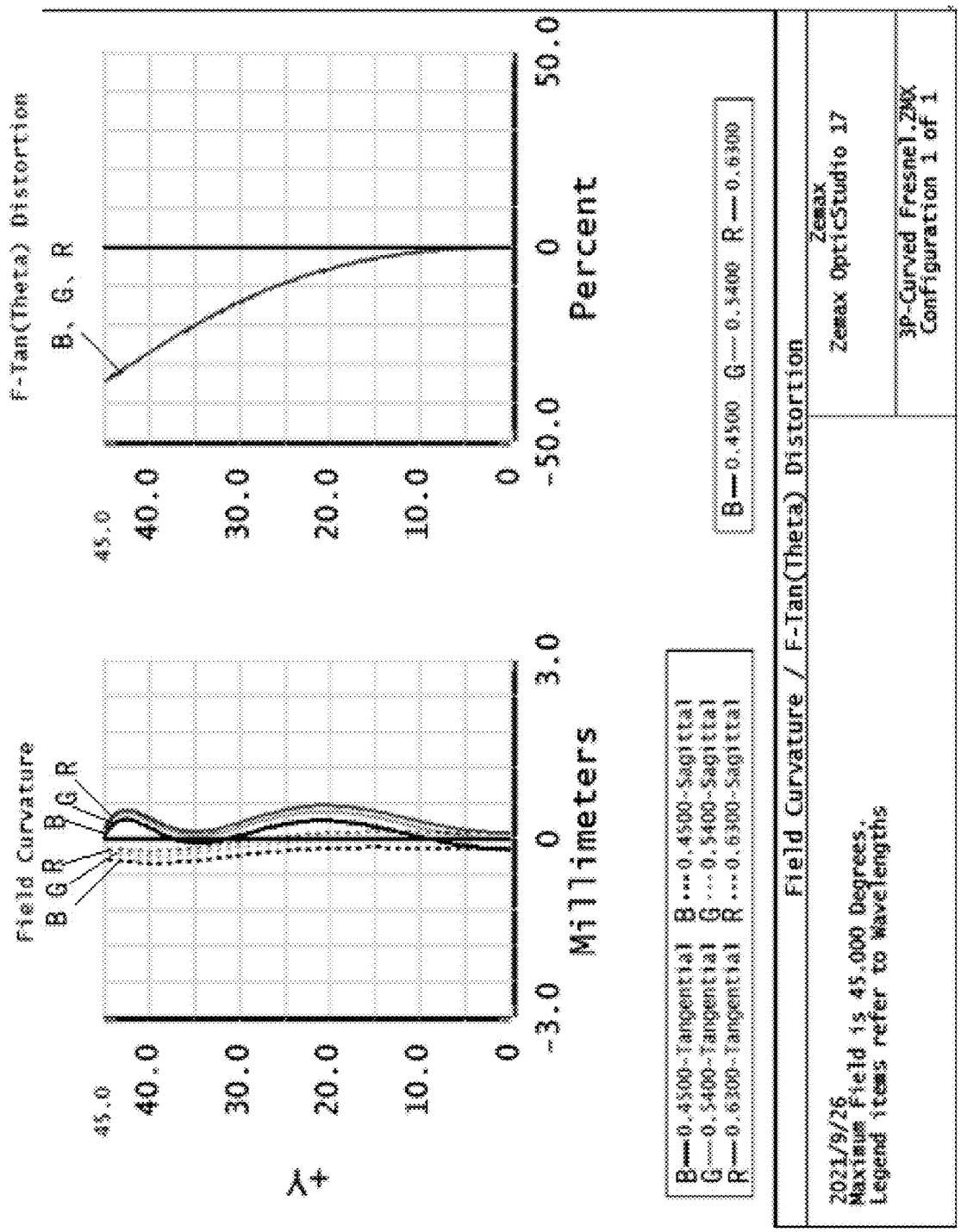
FIG. 4 is a field curvature and distortion diagram of an optical system according to the first embodiment of the present disclosure.

As shown in FIG. 4, the field curvatures of RGB wavelengths in T and S directions are less than 0.5 mm, and the maximum distortion is at the position of the maximum field of view and is less than 34.5%.

Figure 5:
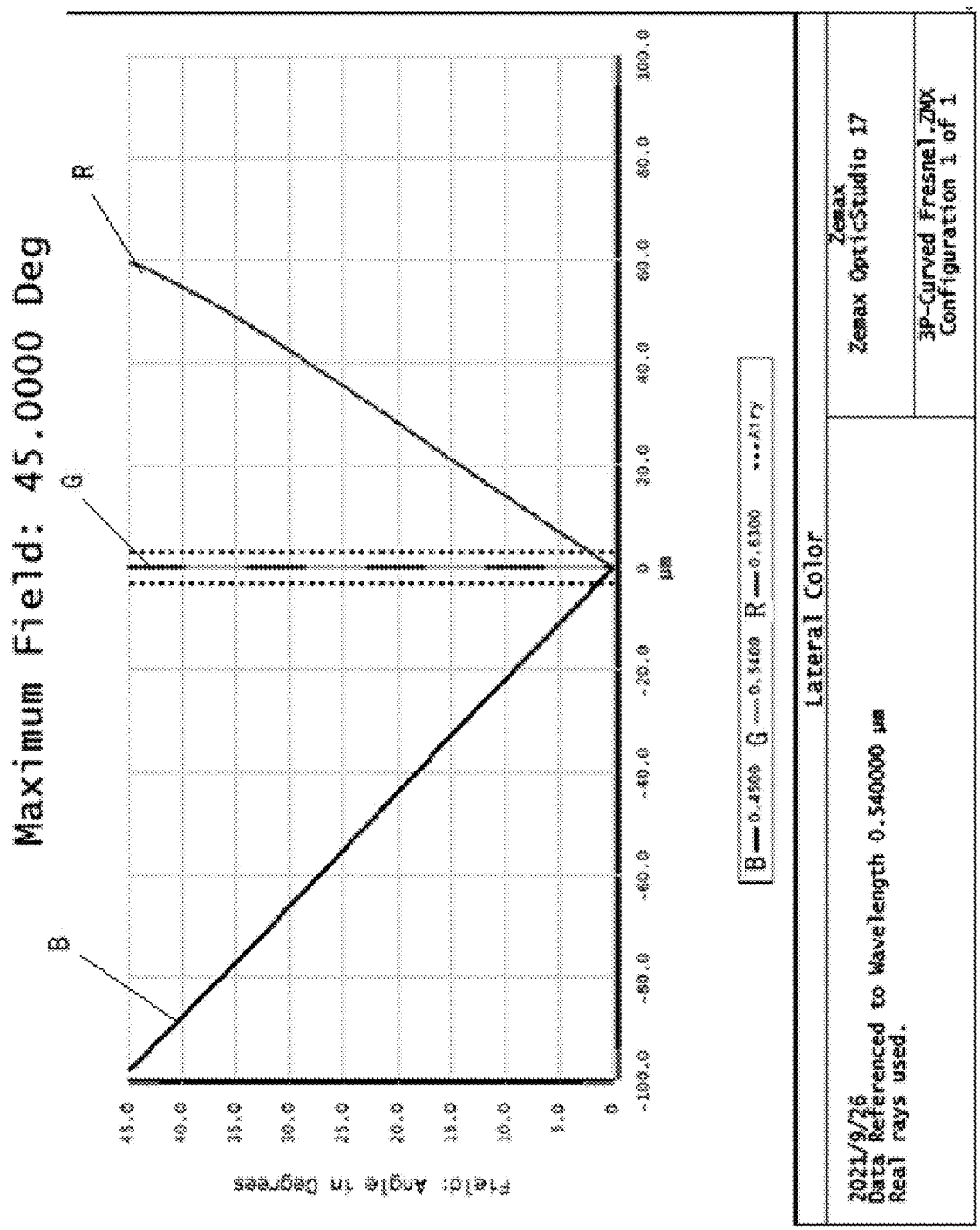
FIG. 5 is a dispersion diagram of an optical system according to the first embodiment of the present disclosure.

As shown in FIG. 5, the maximum dispersion of RGB is at the position of the maximum field of view, the whole RGB is 450 nm to 610 nm, and the LCA is 158 nm.

Second Embodiment

The second embodiment provides an optical system. The structural parameters of the optical system are shown in Table 2.

Among the surface parameters that achieve the best imaging quality:

the second surface 12 of the first lens 1 is a Fresnel surface having a curved base, and its radius value is 40 mm; when it is less than 40 mm, the imaging quality will decline;

when the radius value of the second surface 12 of the first lens 1 is 40 mm, the radius of the curved base of the corresponding third surface 21 (the Fresnel surface having a curved base) of the second lens 2 is 170 mm.

The performance of the optical system of the second embodiment of the present disclosure is demonstrated by the following parameters.

Figure 6:
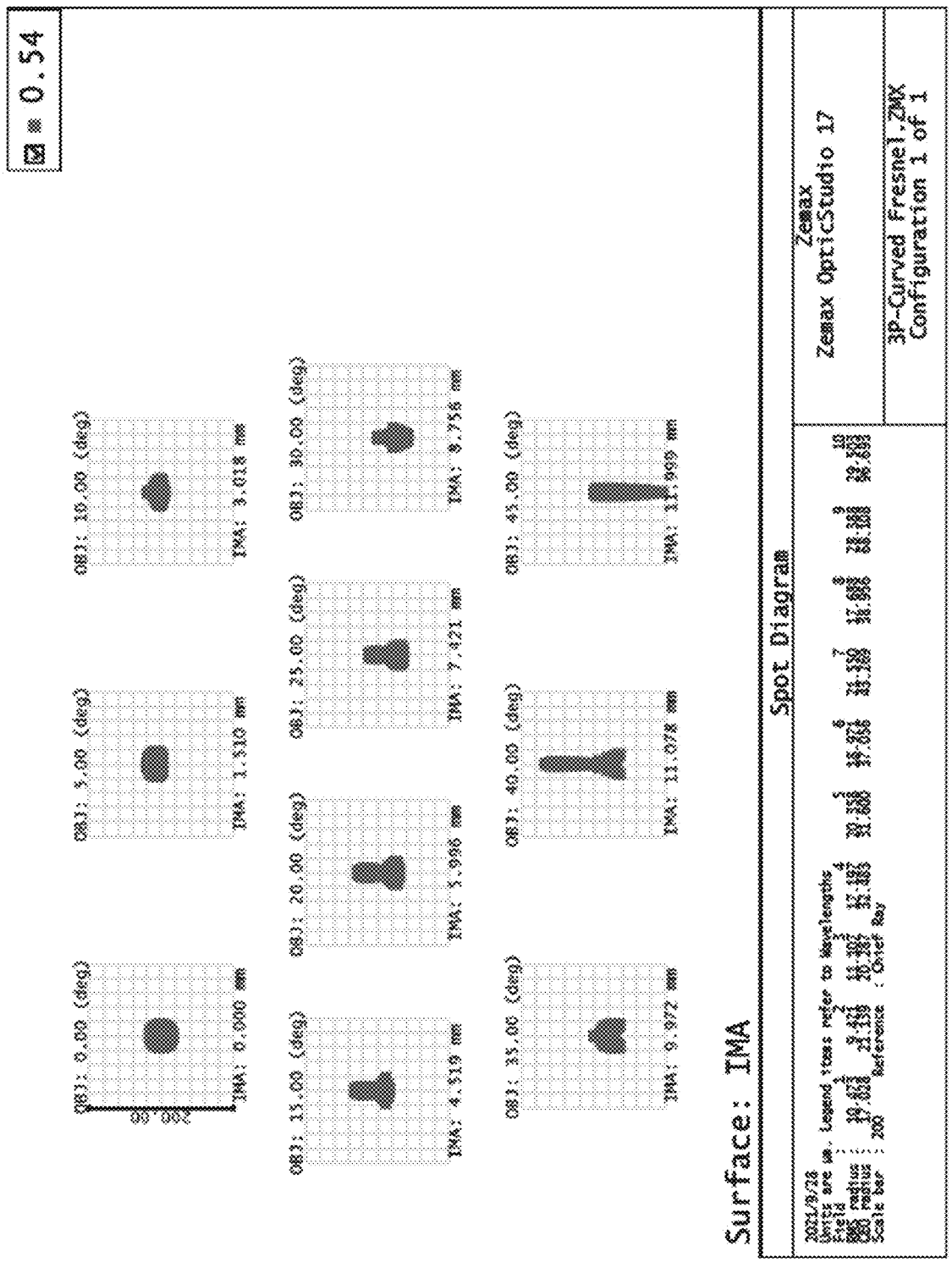
FIG. 6 is a spot diagram of an optical system according to a second embodiment of the present disclosure.

As shown in FIG. 6, the maximum spot size is at the position of the maximum field of view (1.0F), and its maximum value is less than 30 μm.

Figure 7:
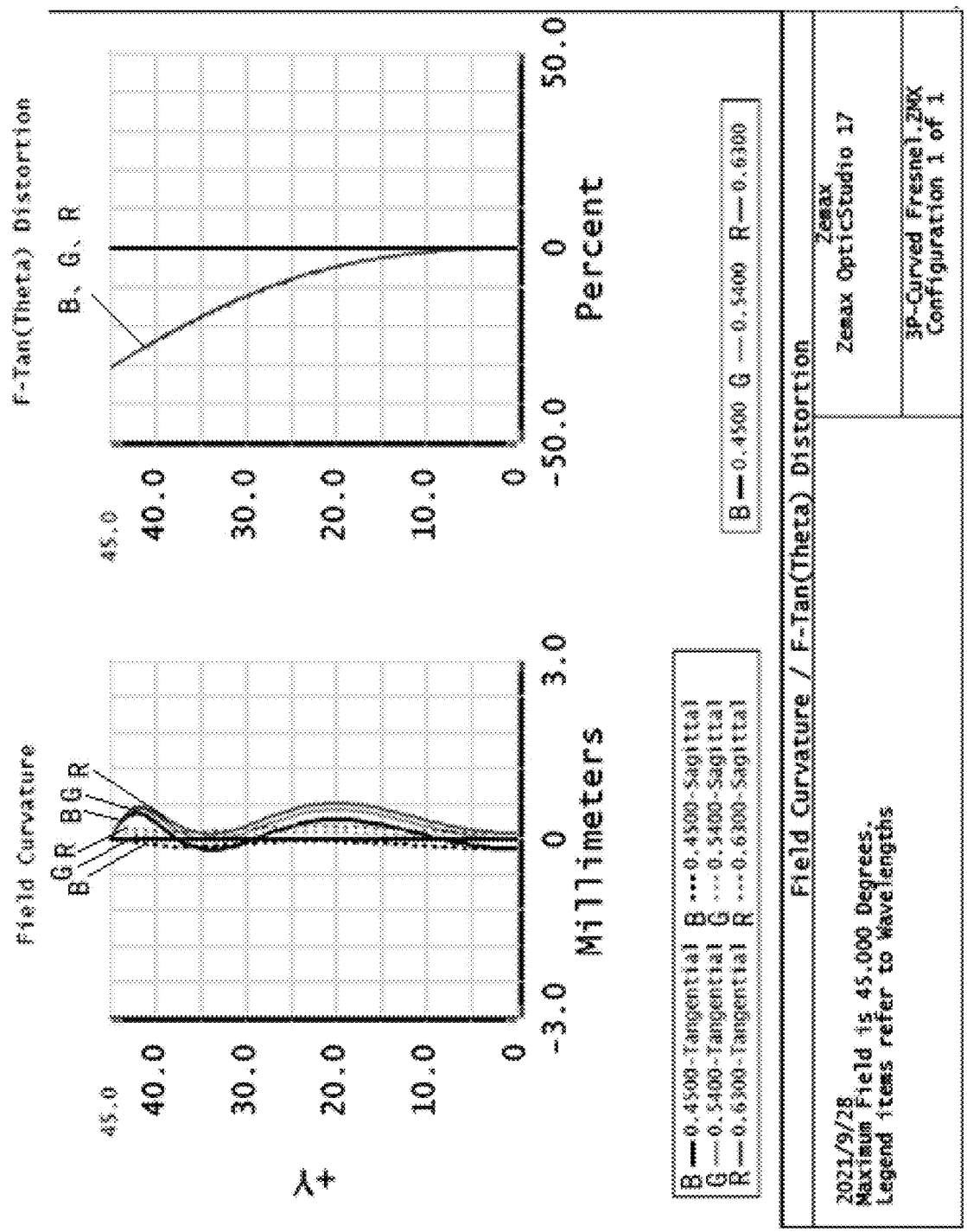
FIG. 7 is a field curvature and distortion diagram of an optical system according to the second embodiment of the present disclosure.

As shown in FIG. 7, the field curvatures of RGB wavelengths in T and S directions are less than 0.5 mm, and the

TABLE 2

| Surf | Type | Radius | Thickness | GLASS | Clear Diam | Conic | 4th |
|---|---|---|---|---|---|---|---|
| OBJ | STANDARD | Infinity | −1500 | | 3000 | 0 | |
| STO | STANDARD | Infinity | 12 | | 4 | 0 | |
| 2 | EVENASPH | 59.42613 | 3.20 | K26R | 26.914 | −10.00017 | −4.931E−005 |
| 3 | XFRESNEL | −40 | 0.931 | | 28.77183 | 0 | |
| 4 | XFRESNEL | 169.043 | 3.811 | K26R | 31.64295 | 0 | |
| 5 | EVENASPH | −65.04932 | 1.933 | | 30.1068 | 4.938798 | 2.217E−005 |
| 6 | EVENASPH | −152.7705 | 2.998 | OKP-1 | 29.21634 | −10.00024 | 3.515E−006 |
| 7 | EVENASPH | 43.56455 | 8.69 | | 27.6078 | 1.709572 | 2.694E−006 |
| 8 | STANDARD | Infinity | 0.45 | BK7 | 24.30083 | 0 | |
| 9 | STANDARD | Infinity | 0.100 | | 24.25755 | 0 | |
| IMA | STANDARD | Infinity | | | 24.06827 | 0 | |

| Surf | 6th | Maxterm | Curvature | Conic | Coeff-4th | Coeff-6th |
|---|---|---|---|---|---|---|
| OBJ | | | | | | |
| STO | | | | | | |
| 2 | −7.367E−008 | | | | | |
| 3 | | 3 | −4.23E−02 | −7.39E−01 | −1.16E−05 | −3.51E−07 |
| 4 | | 3 | 2.83E−02 | 2.95E−01 | 2.32E−05 | 6.10E−08 |
| 5 | 5.543E−008 | | | | | |
| 6 | 1.603E−008 | | | | | |
| 7 | −1.191E−007 | | | | | |
| 8 | | | | | | |
| 9 | | | | | | |
| IMA | | | | | | | maximum distortion is at the position of the maximum field of view and is less than 31%.

Figure 8:
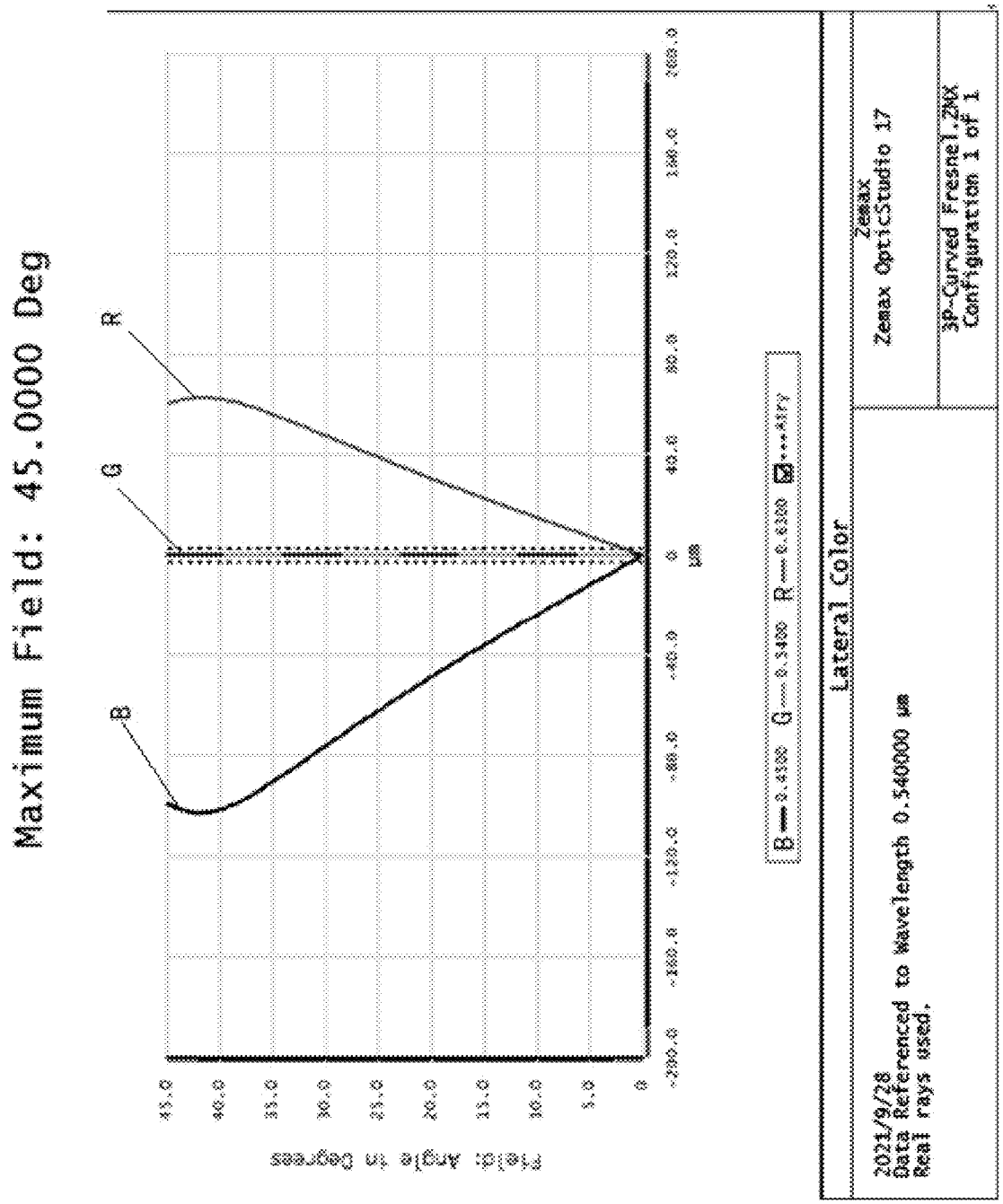
FIG. 8 is a dispersion diagram of an optical system according to the second embodiment of the present disclosure.

As shown in FIG. 8, the maximum dispersion of RGB is at the position of the maximum field of view, the whole RGB is 450 nm to 630 nm, and the LCA is 160 nm.

Third Embodiment

The third embodiment provides an optical system. The structural parameters of the optical system are shown in Table 3.

TABLE 3

| Surf | Type | Radius | Thickness | GLASS | Clear Diam | Conic | 4th | 6th |
|---|---|---|---|---|---|---|---|---|
| OBJ | STANDARD | Infinity | −1500.000 | | 1500.000 | 0.000 | | |
| STO | STANDARD | Infinity | 12.000 | | 2.000 | 0.000 | | |
| 2 | EVENASPH | 57.082 | 3.000 | K26R | 13.506 | −5.061 | −5.006E−05 | −7.866E−08 |
| 3 | XFRESNEL | −200.000 | 1.000 | | 15.819 | 0.000 | 0.000E+00 | 0.000E+00 |
| 4 | XFRESNEL | 62.719 | 4.105 | K26R | 17.111 | 0.000 | 0.000E+00 | 0.000E+00 |
| 5 | EVENASPH | −100.000 | 2.000 | | 15.924 | 1.519 | 2.276E−05 | 6.715E−08 |
| 6 | EVENASPH | −249.999 | 2.999 | OKP-1 | 15.722 | −10.000 | 3.857E−06 | 8.592E−09 |
| 7 | EVENASPH | 42.732 | 9.966 | | 14.721 | 2.504 | | |
| 8 | STANDARD | Infinity | 0.450 | BK7 | 12.183 | 0.000 | | |
| 9 | STANDARD | Infinity | 0.100 | | 12.157 | 0.000 | | |
| IMA | STANDARD | Infinity | −1500.000 | | 12.059 | 0.000 | | |

| Surf | Maxterm | Curvature | Conic | Coeff-4th | Coeff-6th |
|---|---|---|---|---|---|
| OBJ | | | | | |
| STO | | | | | |
| 2 | | | | | |
| 3 | 3 | −4.35E−02 | −7.72E−01 | −1.5298E−05 | −2.4825E−07 |
| 4 | 3 | 2.98E−02 | 2.33E−01 | 2.6506E−05 | 5.2079E−08 |
| 5 | | | | | |
| 6 | | | | | |
| 7 | | | | | |
| 8 | | | | | |
| 9 | | | | | |
| IMA | | | | | |

Among the surface parameters that achieve the best imaging quality:

the second surface 12 of the first lens 1 is a Fresnel surface having a curved base, and its radius value is 200 mm; when it is greater than 200 mm, the imaging quality will decline;

when the radius value of the second surface 12 of the first lens 1 is 40 mm, the radius of the curved base of the corresponding third surface 21 of the second lens 2 (the Fresnel surface having a curved base) is 62 mm.

The performance of the optical system of the third embodiment is demonstrated by the following parameters.

Figure 9:
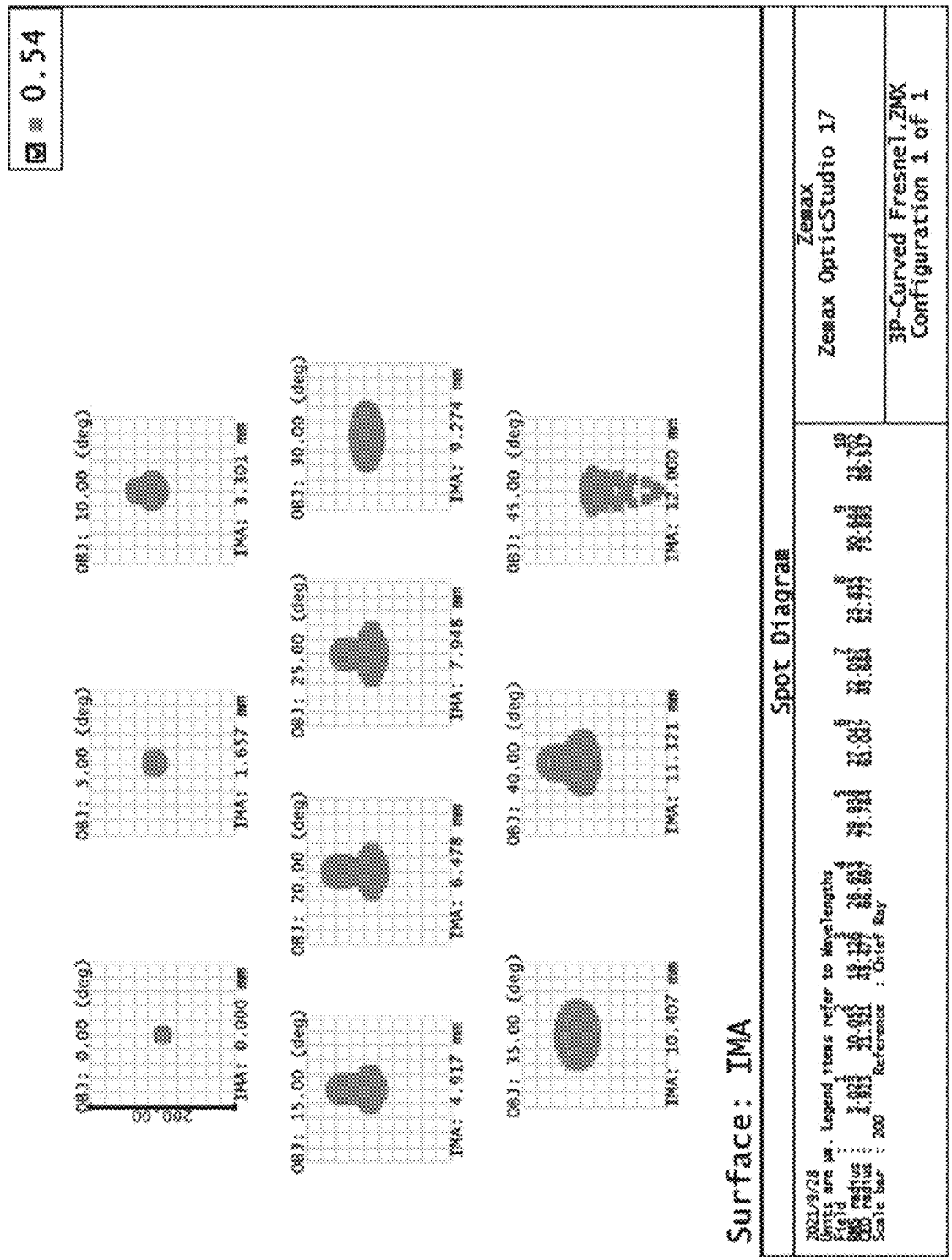
FIG. 9 is a spot diagram of an optical system according to a third embodiment of the present disclosure.

As shown in FIG. 9, the maximum spot size is at the position of the maximum field of view (0.9F), and its maximum value is less than 31 μm.

Figure 10:
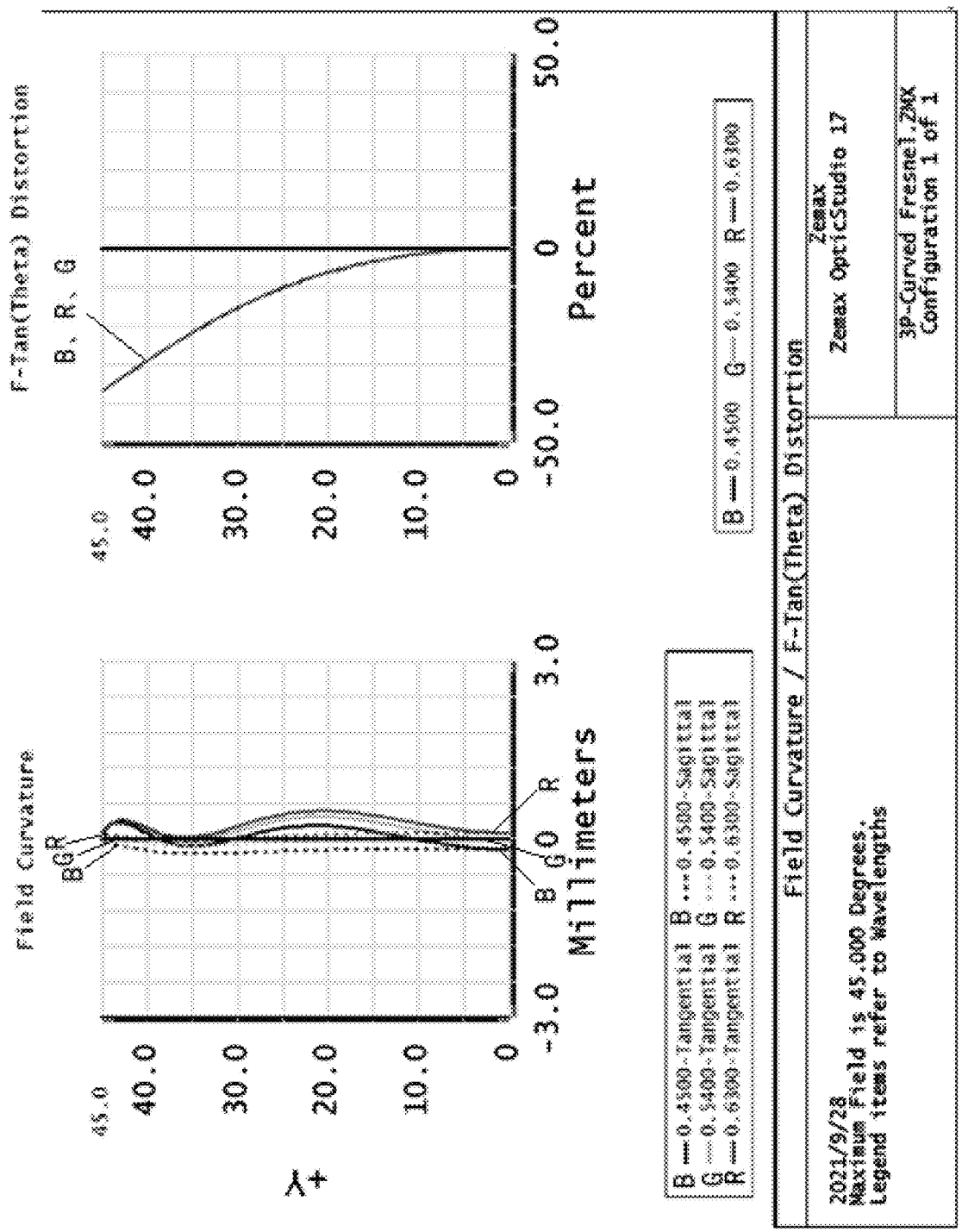
FIG. 10 is a field curvature and distortion diagram of an optical system according to the third embodiment of the present disclosure.

As shown in FIG. 10, the field curvatures of RGB wavelengths in T and S directions are less than 0.5 mm, and the maximum distortion is at the position of the maximum field of view and is less than 38%.

Figure 11:
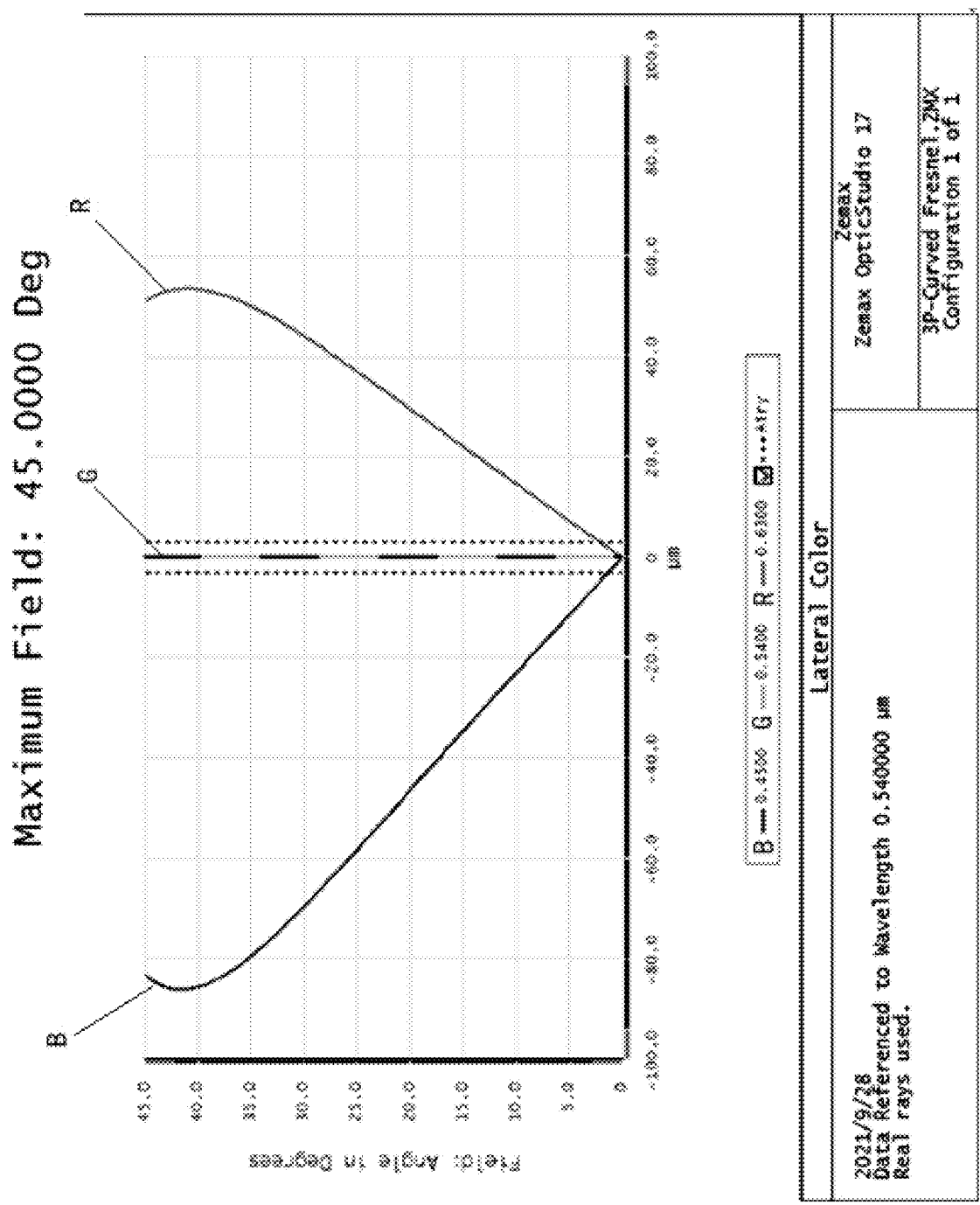
FIG. 11 is a dispersion diagram of an optical system according to the third embodiment of the present disclosure.

As shown in FIG. 11, the maximum dispersion of RGB wavelengths is at the position of the maximum field of view, the whole RGB is 450 nm to 630 nm, and the LCA is 140 nm.

The embodiments of the present disclosure provide a short-focus optical system, which does not involve a folded optical path.

(1) Ultra-short-focus is realized by a combination of three (or more) lenses.

(2) The surface combination form of aspherical surface+ Fresnel surface having a curved base is used to realize a narrow air gap and further realize a short total optical length.

(3) Low dispersion of the optical path is realized by the selection and cooperation of materials having different refractive indexes and Abbe numbers.

(4) The combination of two convex lenses and a concave lens realizes the effects of high resolution and low dispersion.

According to another aspect of the present disclosure, a head mounted display is provided.

The head mounted display comprises an optical system as described above.

The head mounted display is, for example, a VR device.

The description of the above embodiments focuses on the differences between various embodiments. As long as the different optimized features between the embodiments are not contradictory to each other, they can be combined to form a better embodiment, which will not be repeated herein for simplicity of the description.

Although some specific embodiments of the present disclosure have been described in detail by examples, those skilled in the art should understand that the above examples are only for illustration, not for limiting the scope of the present disclosure. Those skilled in the art should understand that the above embodiments can be modified without departing from the scope and spirit of the present disclosure. The scope of the present disclosure is defined by the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An optical system, comprising:
a third lens (3), a second lens (2) and a first lens (1) arranged successively along a propagation direction of incident light;
an effective focal length f1 of the first lens (1) is 20 mm≤f1≤40 mm,
an effective focal length f2 of the second lens (2) is 20 mm≤f2≤40 mm, and
an effective focal length f3 of the third lens (3) is −75 mm≤f3≤−35 mm,
the first lens (1) comprises a first surface (11) and a second surface (12), and the second lens (2) comprises a third surface (21) and a fourth surface (22); the second surface (12) and the third surface (21) are arranged adjacent to each other and are both set as Fresnel surfaces has a curved base; and the first surface (11) and the fourth surface (22) are both aspherical surfaces,
the absolute value of a radius R1 of the first surface (11) of the first lens (1) satisfies 45 mm≤Abs (R1)≤65 mm;
the absolute value of a radius R0 of the curved base on the second surface (12) of the first lens (1) satisfies 40 mm≤Abs(R0)≤200 mm, and the absolute value of a radius R2 of the second surface (12) satisfies 20 mm≤Abs (R2)≤40 mm;
the absolute value of a conic constant K1 of the first surface (11) and the second surface (12) of the first lens (1) satisfies Abs (K1)≤10,
the absolute value of a radius R0' of the curved base on the third surface (21) satisfies 60 mm≤Abs (R0')≤170 mm, and the absolute value of a radius R3 of the third surface (21) satisfies 20 mm≤Abs (R3)≤40 mm;
the absolute value of a radius R4 of the fourth surface (22) satisfies 60 mm≤Abs (R4)≤80 mm;
the absolute value of a conic constant K2 of the third surface (21) and the fourth surface (22) of the second lens (2) satisfies Abs (K2)≤10.

2. The optical system according to claim 1, wherein the first lens (1) and the second lens (2) both have positive focal powers, and the third lens (3) has a negative focal power.

3. The optical system according to claim 1, wherein a first spacing (T1) is provided between the first lens (1) and the second lens (2), the first spacing (T1) is set to 0.2 mm≤T1≤1 mm; a second spacing (T2) is provided between the second lens (2) and the third lens (3), and the second spacing (T2) is set to 1 mm≤T2≤3 mm; and the first lens (1), the second lens (2) and the third lens (3) are located on a same optical axis.

4. The optical system according to claim 1, wherein the third lens (3) comprises a fifth surface (31) and a sixth surface (32), and at least one of the fifth surface (31) and the sixth surface (32) is an aspherical surface.

5. The optical system according to claim 1, wherein the first lens (1) and the second lens (2) are made of a same material, and are made of a COP material; and the third lens (3) is made of an OKP material or an EP material.

6. The optical system according to claim 1, wherein an effective focal length f of the optical system satisfies 15 mm≤f≤25 mm.

7. A head mounted display comprising the optical system according to claim 1.

8. A head mounted display comprising the optical system according to claim 2.

9. A head mounted display comprising the optical system according to claim 3.

10. A head mounted display comprising the optical system according to claim 4.

11. A head mounted display comprising the optical system according to claim 5.

12. A head mounted display comprising the optical system according to claim 6.

* * * * *